United States Patent
Le Bastard et al.

(10) Patent No.: US 10,449,844 B2
(45) Date of Patent: Oct. 22, 2019

(54) DEVICE FOR GENERATING AIR CUTRAINS, IN PARTICULAR FOR A RAILWAY VEHICLE

(71) Applicant: ALSTOM TRANSPORT TECHNOLOGIES, Saint-Ouen (FR)

(72) Inventors: Jean Le Bastard, Versailles (FR); Christoph Staudt, Heidelberg (DE)

(73) Assignee: Alstom Transport Technologies, Saint-Ouen (FR)

( * ) Notice: Subject to any disclaimer, the term of this patent is extended or adjusted under 35 U.S.C. 154(b) by 423 days.

(21) Appl. No.: 15/016,188

(22) Filed: Feb. 4, 2016

(65) Prior Publication Data

US 2016/0229277 A1    Aug. 11, 2016

(30) Foreign Application Priority Data

Feb. 6, 2015   (FR) ..................... 15 50967

(51) Int. Cl.
*B60J 9/04*    (2006.01)
*B61D 19/02*   (2006.01)
*F24F 9/00*    (2006.01)

(52) U.S. Cl.
CPC ............. *B60J 9/04* (2013.01); *B61D 19/02* (2013.01); *F24F 2009/005* (2013.01)

(58) Field of Classification Search
CPC ... B60J 9/04; F24F 2009/005; F24F 2009/007
See application file for complete search history.

(56) References Cited

U.S. PATENT DOCUMENTS

| 2,516,432 | A | * | 7/1950 | Spencer | F24F 9/00 454/188 |
|---|---|---|---|---|---|
| 3,023,688 | A | * | 3/1962 | Kramer, Jr. | F24F 9/00 454/189 |
| 3,211,077 | A | * | 10/1965 | Kramer, Jr. | F24F 9/00 165/122 |
| 3,394,755 | A | * | 7/1968 | Morrison | F24F 9/00 165/103 |
| 3,527,152 | A | * | 9/1970 | McGowan | B60H 1/00371 454/95 |
| 3,771,323 | A | * | 11/1973 | Simons | A47F 3/0447 454/193 |

(Continued)

FOREIGN PATENT DOCUMENTS

| DE | 3523937 A1 | 1/1987 |
|---|---|---|
| EP | 1439353 A1 | 7/2004 |
| WO | 2014/204297 A1 | 12/2014 |

OTHER PUBLICATIONS

Search Report dated Nov. 25, 2015 in corresponding FR application No. 1550967.

*Primary Examiner* — Avinash A Savani
*Assistant Examiner* — Martha M Becton
(74) *Attorney, Agent, or Firm* — Knobbe, Martens, Olson & Bear, LLP (57) ABSTRACT

A device includes an air curtain generator including air curtain diffusor able to diffuse at least one air curtain along a plane, in at least first and second different diffusion directions. The air curtain generating device includes a control unit able to control the diffusion of the at least one air curtain in one and/or the other of the first and second diffusion directions.

12 Claims, 3 Drawing Sheets

(56) References Cited

U.S. PATENT DOCUMENTS

| | | | | |
|---|---|---|---|---|
| 4,379,391 A * | 4/1983 | Rhee | ............ | F25D 23/023 62/255 |
| 5,312,294 A * | 5/1994 | Meline | ............ | F24F 3/1607 454/190 |
| 5,759,149 A * | 6/1998 | Goldberg | ............ | A61G 11/00 600/22 |
| 5,934,992 A * | 8/1999 | Sohier | ............ | F24F 3/1607 454/190 |
| 6,105,377 A * | 8/2000 | Jeong | ............ | F25D 29/00 62/180 |
| 6,234,892 B1 * | 5/2001 | Geyer | ............ | B60H 1/243 454/188 |
| 6,251,006 B1 * | 6/2001 | Laborde | ............ | F24F 9/00 454/189 |
| 6,334,812 B2 * | 1/2002 | Laborde | ............ | F24F 9/00 454/190 |
| 6,705,940 B1 * | 3/2004 | Moore | ............ | F24F 9/00 454/188 |
| 6,874,331 B2 * | 4/2005 | Chandler | ............ | A47F 3/0447 454/193 |
| 7,158,863 B1 * | 1/2007 | Johnson | ............ | A47F 3/0447 62/256 |
| 8,506,367 B2 * | 8/2013 | Cermak | ............ | B60H 1/00371 454/152 |
| 8,702,481 B1 * | 4/2014 | Wilbourn | ............ | B60J 9/04 296/19 |
| 9,440,510 B2 * | 9/2016 | Cermak | ............ | B60H 1/00371 |
| 9,623,722 B2 * | 4/2017 | Chagnon | ............ | B60H 1/00371 |
| 2001/0002363 A1 * | 5/2001 | Laborde | ............ | F24F 9/00 454/190 |
| 2004/0003617 A1 * | 1/2004 | Chandler | ............ | A47F 3/0447 62/256 |
| 2004/0192187 A1 | 9/2004 | Ashley et al. | | |
| 2005/0282485 A1 * | 12/2005 | Kato | ............ | B60H 1/243 454/136 |
| 2007/0298703 A1 * | 12/2007 | Chen | ............ | F24F 9/00 454/192 |
| 2010/0184365 A1 * | 7/2010 | Brzezinski | ............ | F24F 9/00 454/189 |
| 2011/0097985 A1 * | 4/2011 | Stauffer | ............ | B60J 5/04 454/162 |
| 2011/0117830 A1 * | 5/2011 | Browne | ............ | B60J 9/04 454/192 |
| 2012/0034858 A1 * | 2/2012 | Reichel | ............ | B60H 1/00828 454/75 |
| 2016/0146485 A1 * | 5/2016 | Weening | ............ | F24F 11/00 454/188 |

\* cited by examiner

DEVICE FOR GENERATING AIR CUTRAINS, IN PARTICULAR FOR A RAILWAY VEHICLE

CROSS-REFERENCE TO RELATED APPLICATION

This application claims priority to French Patent Application No. 15 50967 filed on Feb. 6, 2015, the disclosure of which including the specification, the drawings, and the claims is hereby incorporated by reference in its entirety.

FIELD OF THE INVENTION

The present invention relates to a device for generating air curtains, in particular designed to equip a vehicle, and more particularly a railroad vehicle.

BACKGROUND OF THE INVENTION

Already known in the state of the art, and in particular from EP 0,968,096, is a device for generating air curtains along a plane defining an inside zone and an outside zone, including means for generating an air curtain.

Such an air curtain is designed to cover an opening formed in a wall arranged in said plane. The air curtain is a laminar air flow, uniformly covering an entire height and/or width of the opening. This air curtain forms an air barrier effectively separating the inside zone from the outside zone, in particular preventing exchanges of air and heat between the inside zone and the outside zone, or preventing the intrusion of dust or insects from the outside zone toward the inside zone.

SUMMARY OF THE INVENTION

The present invention in particular aims to improve such an air curtain generating device, by improving its functionalities and adapting it to the constraints of a confined space, such as a railroad vehicle. In particular, the invention especially aims to provide a device for generating air curtains favoring the flow of people passing through the opening.

To that end, the invention in particular relates to a device for generating air curtains along a plane defining an inside zone and an outside zone, comprising air curtain generator, characterized in that the air curtain generator include air curtain diffusor, able to diffuse at least one air curtain along said plane, in at least first and second separate diffusion directions, the air curtain generating device including a control unit able to control the diffusion of at least one air curtain in one and/or the other of the first and second diffusion directions.

Such a device is generally designed to equip an opening provided with a door.

In order to ensure the thermal comfort of passengers located in the inside zone, it is desirable to minimize heat exchanges between the inside zone and the outside zone. This in particular makes it possible to limit the consumption of air conditioner equipping this inside zone.

To that end, in the state of the art, the door is kept closed as much as possible to limit these heat exchanges.

By keeping the door open for longer, the passage of people through the opening is allowed during a longer length of time, such that the flow of people through the opening is improved.

The device according to the invention makes it possible to optimize the flow of people through other means.

More particularly, by orienting the flow of the air curtain in a diffusion direction oriented toward the outside of the vehicle, a slight thrust effect is exerted on exiting people moving from the inside zone toward the outside zone, thus encouraging them to move in that direction. Furthermore, the flow of air oriented toward the platforms encourages passengers standing in the outside zone near the opening to move away, and thus not to hinder the passage of exiting people.

Likewise, by orienting the flow of the air curtain in a diffusion direction oriented toward the inside of the vehicle, a slight thrust effect is exerted on entering people moving from the outside zone toward the inside zone, thus encouraging them to move in that direction. Additionally, the flow of the air curtain oriented toward the inside of the vehicle encourages people standing in the inside zone near the opening to move away, and thus not to hinder the passage of the entering people.

Thus, the device according to the invention makes it possible to optimize the flow of people crossing through said opening, by favoring the exit or entry of people through that opening.

A device according to the invention may further include one or more of the following features, considered alone or according to any technically possible combination(s).

The first diffusion direction is oriented toward the inside zone, and the second diffusion direction is oriented toward the outside zone.

The generator include diffusor diffusing a single air curtain, along said plane, and the air curtain generating device includes means for modifying the orientation of the diffusor, between a first position, in which the air curtain is diffused in the first diffusion direction, and a second position, in which the air curtain is diffused in the second diffusion direction.

The generating device includes first means for generating a first air curtain, comprising first diffusor diffusing the first air curtain along said plane, in the first diffusion direction, and second means for generating a second air curtain, comprising second diffusor diffusing the second air curtain, along said plane, in the second diffusion direction, the control unit being able to control the diffusion of the first air curtain and the second air curtain.

The control unit is able to enter a first operating mode, in which the flow of the first air curtain is increased and/or the flow of the second air curtain is reduced to favor the movement of people from the outside zone toward the inside zone, or in a second operating mode, wherein the flow of the first air curtain is reduced and/or the flow of the second air curtain is increased to favor the movement of people from the inside zone toward the outside zone.

The first and second air curtains together generate, by venturi effect, a resulting air flow diffusing in a resulting direction, the control unit being able to modify said resulting direction by modifying the flows of the first and second air curtains.

The control unit is able to regulate a flow and/or a temperature of each air curtain.

The generating device includes means for detecting weather conditions in the outside zone, in particular measuring the temperature in the outside zone and/or detecting rain, the control unit being configured to adjust the flow and/or temperature of each air curtain based on the detected weather conditions.

Said generating device includes means for air conditioning in the inside zone, able to enter different air conditioning states of said inside zone, the control unit being configured to adjust the flow and/or temperature of the at least one air curtain as a function of the status of the air conditioner.

The generating device includes means for detecting people near said plane, the control unit being configured to adjust the flow of the at least one air curtain based on the presence and/or movements of people near said plane.

The diffusor include nozzles for emitting an air curtain, at least one of the nozzles being arranged to emit the corresponding air curtain vertically, and at least one of the nozzles being arranged to emit the corresponding air curtain horizontally.

The invention also relates to a cabin, in particular a vehicle cabin, defining an inside zone and an outside zone, and including a passage opening between the inside zone and the outside zone, including an air curtain generating device as previously defined, arranged to generate the at least one air curtain covering the passage opening, said passage opening being defined in said plane.

Advantageously, the cabin includes at least one door movable between a closed position, in which the passage opening is closed off, and an open position, in which said passage opening is free, the control unit being configured to increase the flow of the at least one air curtain prior to the passage of the door from its open position to its closed position.

BRIEF DESCRIPTION OF THE DRAWINGS

The invention will be better understood upon reading the following description, provided solely as an example and done in reference to the appended figures, in which.

DETAILED DESCRIPTION

Figure 1:
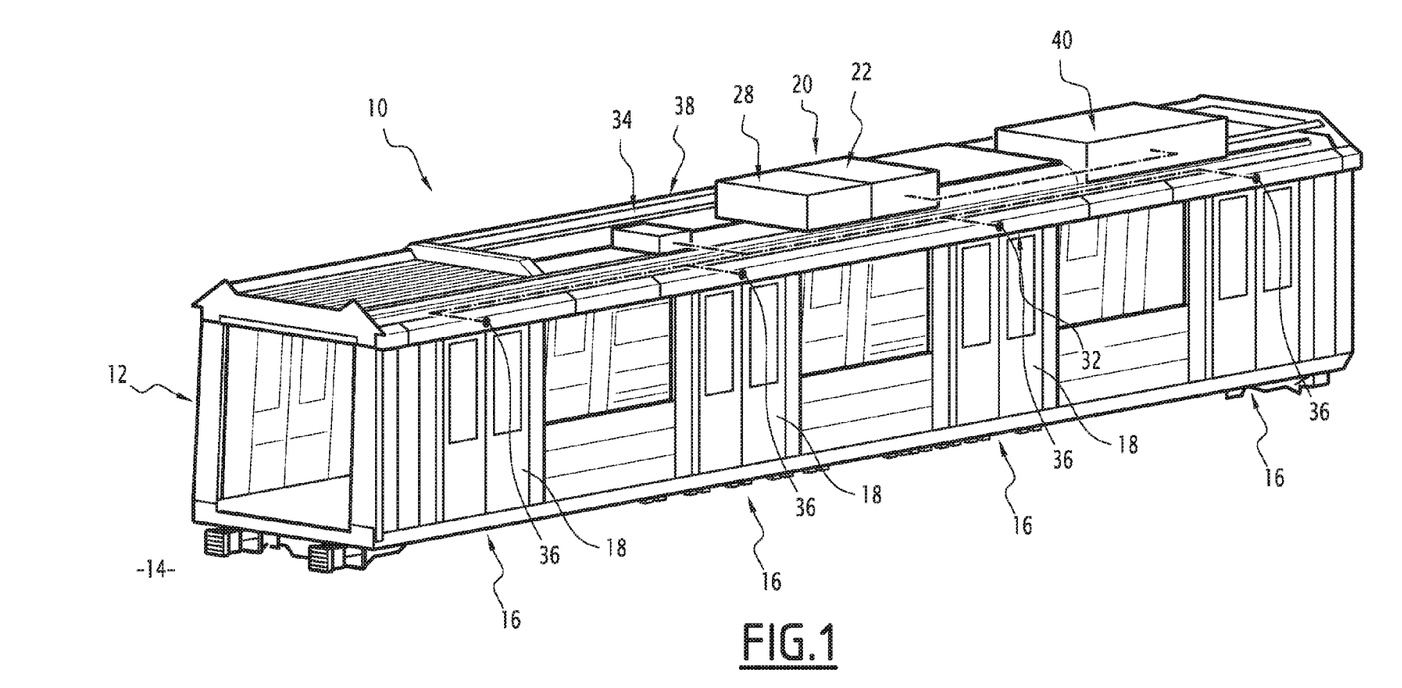
FIG. 1 is a perspective view of a cabin, in particular formed by a railroad vehicle car, equipped with an air curtain generating device according to one example embodiment of the invention.

FIG. 1 shows a cabin 10, in particular a vehicle cabin and more particularly a cabin formed by a railroad vehicle car.

The cabin 10 is formed by walls together defining an inside zone 12 and an outside zone 14.

At least one of these walls includes at least one passage opening 16 between the inside zone 12 and the outside zone 14. The cabin 10 also includes, for each passage opening 16, at least one door 18 movable between a closed position, in which the passage opening 16 is closed off, and an open position, in which this passage opening 16 is free.

The passage opening 16 extends substantially in a plane P. Thus, the plane P forms a boundary between the inside zone 12 and the outside zone 14.

The cabin according to the invention includes an air curtain generating device 20, including air curtain generator including air curtain diffusing means, able to diffuse at least one air curtain along the plane (P), in at least first and second different diffusion directions.

The air curtain generating device 20 includes a control unit 34 able to control the diffusion of the at least one air curtain in one and/or the other of the first and second diffusion directions.

Advantageously, the first diffusion direction is oriented toward the inside zone 12, and the second diffusion direction is oriented toward the outside zone 14.

Thus, the generating device 20 makes it possible to favor the emission of an air curtain in the first direction when passengers move from the outside zone 14 toward the inside zone 12, and to favor the emission of an air curtain in the second direction when passengers move from the inside zone 12 toward the outside zone 14.

Figure 2:
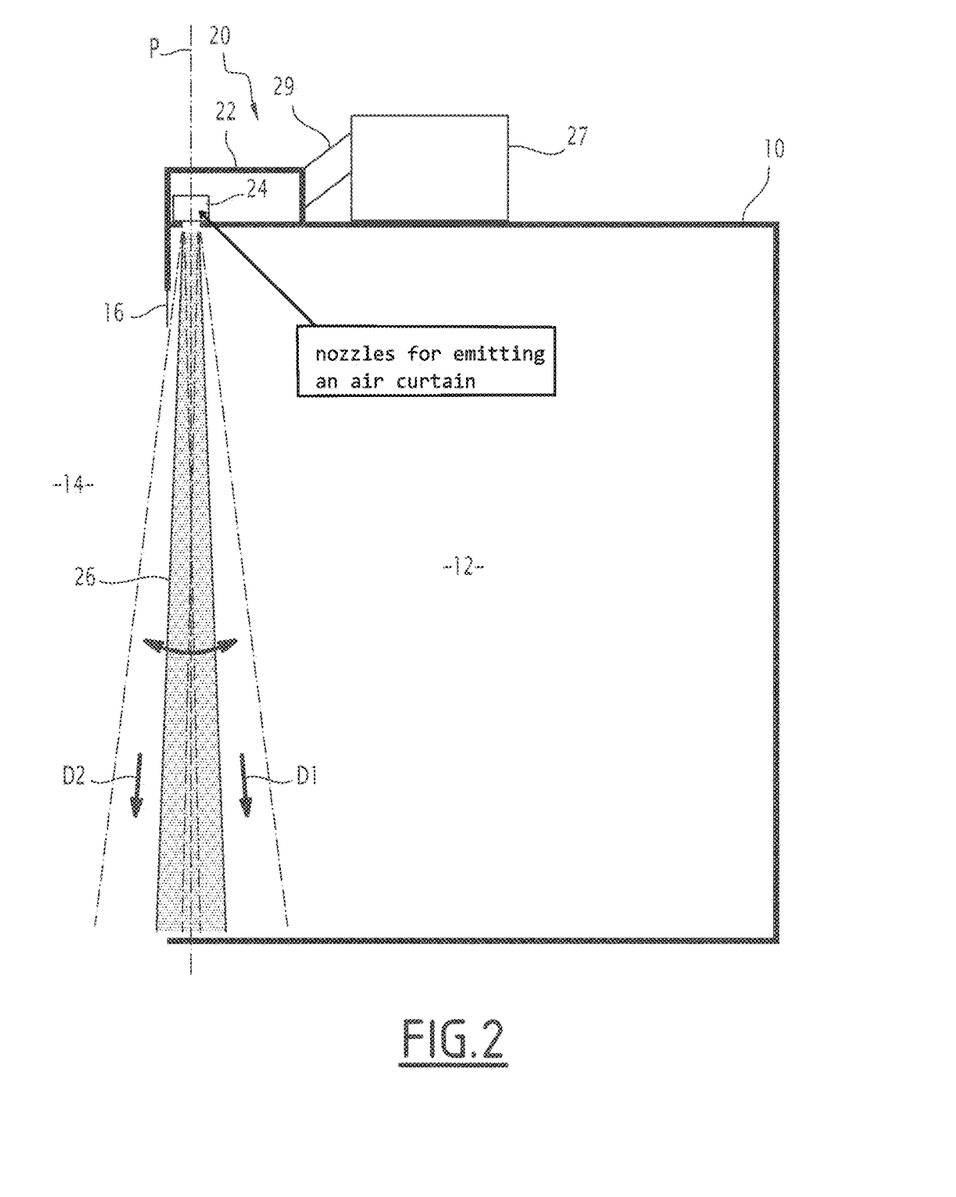
FIG. 2 is a diagrammatic sectional view of the cabin of FIG. 1, equipped with an air curtain generating device according to a first example embodiment of the invention.

FIG. 2 shows an air curtain generating device 20 according to a first example embodiment of the invention.

This generating device 20 includes means 22 for generating a single air curtain 26. Such an air curtain 26 is also called "air knife" when the air curtain is generated with a reduced diffusion width, approximately 10°.

The generator 22 comprise diffusor 24 diffusing the air curtain 26 along said plane P.

The diffusor 24 for example include nozzles for emitting the air curtain 26, arranged near the plane P. These emission nozzles are supplied by a blower 27 by means of an appropriate pipe 29. The blower 27 advantageously makes it possible to supply the emission nozzles with air with a variable flow and/or temperature.

The generating device 20 according to the invention further includes an orientation switch, which serves as a means for modifying the orientation of the diffusor 24 between a first position, in which the air curtain 26 is diffused in a first diffusion direction D1, oriented toward the inside zone 12, and a second position in which the air curtain 26 is diffused in a second diffusion direction D2, oriented toward the outside zone 14.

For example, the orientation modification means allow a rotation of the diffusor 24, and more particularly of the nozzles, such that the diffused air curtain 26 is oriented in the desired diffusion direction.

Advantageously, the diffusor 24 can assume a plurality of angular positions, between a first angular position in which the air curtain 26 is diffused in the first diffusion direction D1 and a second angular position in which the air curtain 26 is diffused in the second diffusion direction D2.

The angular position of the diffusor 24 is controlled by the control unit 34, based on the situation. For example, the diffusor 24 are oriented so that the air curtain 26 is emitted toward the inside zone 12 (first diffusion direction D1) when passengers are entering the vehicle and toward the outside zone 14 (second diffusion direction D2) when passengers are leaving this vehicle.

In the described example, the nozzles are arranged to emit the air curtain 26 vertically, from top to bottom.

According to an alternative that is not shown, the nozzles are arranged to emit the corresponding air curtain horizontally.

Likewise, some nozzles may be arranged on either side of the opening 16, and emit air flows coming together to form the corresponding air curtain.

Advantageously, the control unit 34 of the air curtain 26 is able to adjust the flow and/or temperature of the air of this air curtain 26 and able to control the air curtain 26 in a desired diffusion direction.

To that end, the control unit 34 is able to control the blower 27 supplying the air curtain 26 and to control orientation modification means allowing a rotation of the diffusor 24 so as to orient the air curtain 26 in the desired diffusion direction.

The control of the diffusion direction of the air curtain 26 by the control unit 34, via the orientation modification means, makes it possible to optimize the passage of people through the opening 16. More particularly, when the cabin 10 is a railroad vehicle car, this makes it possible to optimize the flow of passengers at a station.

For example, the control unit 34 is able to enter a first operating mode, in which the flow of the air curtain 26 is oriented in the first diffusion direction D1, toward the inside zone 12, to favor the movement of people from the outside zone 14 toward the inside zone 12. In this case, the air curtain 26 tends to drive the entering people from the outside zone 14 toward the inside zone 12, and to encourage people standing in the inside zone 12 near the opening 16, who may hinder the passage of entering people, to move away.

The first diffusion direction D1 for example forms an angle of 15° with the plane P.

The control unit 34 is also able to enter a second operating mode, in which the flow of the air curtain 26 is oriented in the second diffusion direction D2, toward the outside zone 14, to favor the movement of people toward the outside zone 14. In this case, the air curtain 26 tends to drive the people exiting from the inside zone 12 toward the outside zone 14, and to encourage people standing in the outside zone 14 near the opening 16, who may hinder the passage of exiting people, to move away.

The second diffusion direction D2 for example forms a 20° angle with the plane P.

The transition from the first to the second operating mode may be timed from the opening of the door 18, for example to favor the exit of people during a first time delay following the opening of the door 18, then to favor the entry of people during a second time delay, prior to the closing of the door 18.

Alternatively or additionally, the device 20 includes means 36 for detecting people near the plane P. In this case, the control unit 34 is able to adjust the diffusion direction of the air curtain 26 based on the presence and/or movements of people near said plane P. Thus, instead of timing the first and second operating modes, the control unit 34 stays in the second operating mode as long as people are detected as moving from the inside zone 12 toward the outside zone 14, then stays in the first operating zone as long as people are detected as moving from the outside zone 14 toward the inside zone 12.

According to another alternative, the transition to the first or second operating mode can be commanded manually, in particular by the conductor of the rail vehicle and/or by a station agent.

Furthermore, the control unit 34 is advantageously able to reduce the flows of the air curtain 26 when people are detected near the plane P, for the comfort of said people.

Alternatively or additionally with respect to the operating modes described above, the control unit 34 advantageously has a third operating mode in which the flow of the air curtain 26 is increased, prior to the transition of the door 18 from its open position to its closed position, in order to encourage people located near the plane P to move away from said plane P, so as not to hinder the closing of the door 18.

Alternatively, this flow increase is only done when at least one person is detected near the plane P by the detection means 36.

Advantageously, the device 20 includes means 38 for detecting weather conditions in the outside zone 14, for example arranged on the control unit 34. These detection means 38 are in particular able to measure a temperature in the outside zone and/or to detect rain or snow and/or to detect the wind speed.

The control unit 34 is then able to adjust the flow and/or temperature of the air curtain 26 based on the detected weather conditions.

The temperature of the air curtain 26 can in particular be increased when the measured outside temperature is below a predetermined threshold, and/or when manually commanded.

Likewise, the temperature of the air curtain 26 can be lowered when the detected outside temperature is above a predetermined threshold, and/or when manually commanded.

The optimal temperature for the air curtain can be calculated by the control unit 34 based on the outside temperature, or alternatively can be chosen manually.

Advantageously, the control unit 34 is configured to increase the flow of the air curtain when rain or wind is detected. Thus, the air curtain 26 has a drying effect for passengers passing through it and a wind protection effect.

Advantageously, the control unit 34 is configured to interrupt the air curtain 26 when the door 18 is in the closed position or after a time delay following the closing of the store. In this case, this air curtain 26 is reactivated prior to opening of the door 18, in particular at a station, for example in order to encourage people near this door 18 to move back before it opens.

Alternatively, the control unit 34 is configured to keep the air curtain activated even when the door 18 is closed, so as to optimize the thermal insulation thereof, and thus keep the inside 12 under optimal climate control conditions.

It will be noted that alternatively, the orientation of the air curtain could be based on an aeraulic principle.

Figure 3:
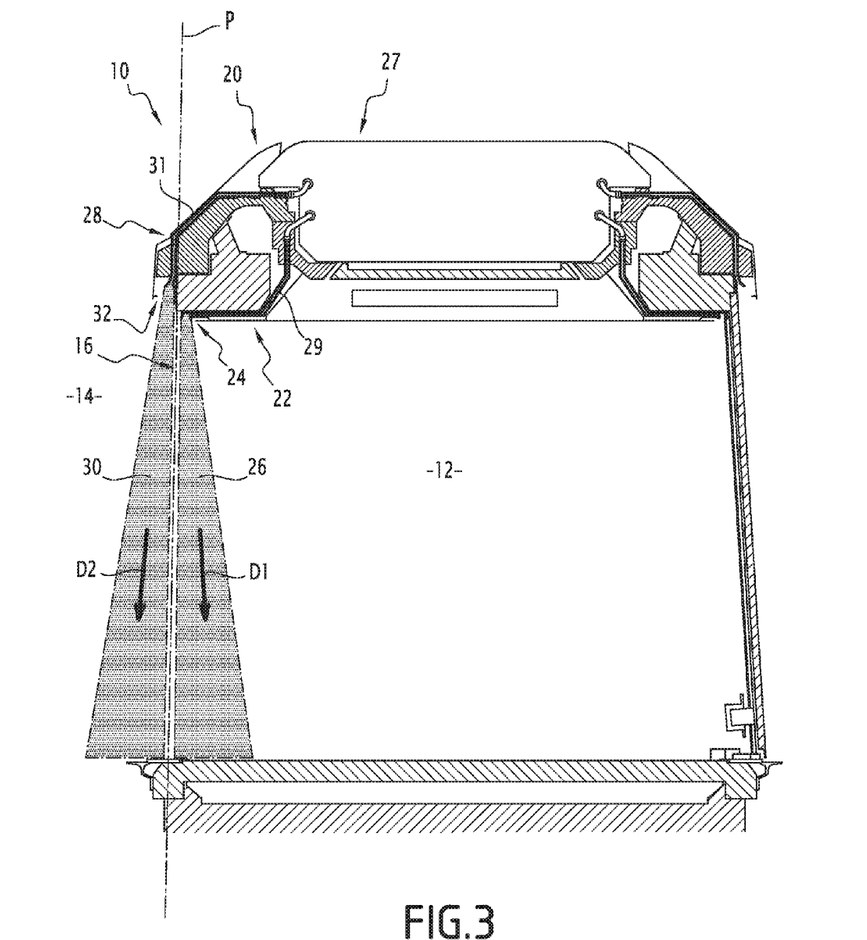
FIG. 3 is a diagrammatic sectional view of the cabin of FIG. 1, equipped with an air curtain generating device according to a second example embodiment of the invention.

FIG. 3 shows an air curtain generating device 20 according to the second example embodiment of the invention. In this FIG. 3, the elements similar to those of FIG. 2 are designated using identical references.

According to this second example embodiment, the air curtain generating device 20 includes first means 22 for generating a first air curtain 26, comprising first diffusor 24 diffusing the first air curtain 26 along said plane P, in the inside zone 12. Advantageously, the first diffusor 24 are oriented so that the first air curtain 26 does not cross the plane P.

The first diffusor 24 for example includes first nozzles for emitting the first air curtain 26, arranged near the plane P and oriented to emit the first air curtain 26 toward the inside zone 12, in the first diffusion direction D1. The first emission nozzles are supplied by a blower 27 by means of an appropriate pipe 29. The blower 27 advantageously makes it possible to supply the first air emission nozzles with a variable flow and/or temperature.

The generating device 20 according to the invention further includes second means 28 for generating a second air curtain 30, comprising second diffusor 32 diffusing the second air curtain 30 along said plane P in the outside zone 14. Advantageously, the second diffusor 32 are oriented so that the second air curtain 30 does not cross the plane P.

The second diffusor 32 include second nozzles for emitting the second air curtain 30, arranged near the plane P and oriented to emit the second air curtain 30 toward the outside zone 14, in the second diffusion direction D2.

The second emission nozzles are supplied by a blower by means of an appropriate pipe 31. The blower advantageously makes it possible to supply the second emission nozzles with air with a variable flow and/or temperature.

For example, a same blower supplies the first and second emission nozzles, but with separate branches, including separate and independent means for modifying the flow and temperature of the air of the corresponding air curtain.

Alternatively, each of the first 26 and second 30 air curtains is generated by a separate blower.

Due to their proximity, the first 26 and second 30 air curtains interact with one another, according to the so-called venturi effect principle, allowing, together generating a resulting air flow diffusing in a resulting direction.

The control unit 34 is able to modify said resulting direction by modifying the relative pressures of each air curtain, without requiring a mechanical orientation system.

In one preferred embodiment, to reinforce the venturi effect, the air curtains 26, 30 are generated with a reduced diffusion width of approximately 10°, thus forming air knives. To that end, the emission nozzles are appropriate for generating such air knives. For example, the emission nozzles are of the Coanda type.

In the described example, the first and second nozzles are arranged to emit the first 26 and second 30 air curtains vertically, from top to bottom. Alternatively, the first and second nozzles could be arranged to emit the air curtains from bottom to top. It should be noted that some nozzles may be arranged at the bottom, while being oriented upward, and others at the top, while being oriented downward, to generate two air flows, one pointing downward and the other upward, coming together to form the corresponding air curtain.

According to one alternative that is not shown, the first and second nozzles are arranged to emit the corresponding air curtain horizontally. Likewise, some nozzles may be arranged on either side of the opening 16, and emit air flows coming together to form the corresponding air curtain.

The generating device 20 also includes a control unit 34 for the first 26 and second 30 air curtains, able to adjust the flow and/or temperature of the air of this first air curtain 26 and/or the second air curtain 30. To that end, the control unit 34 is able to control each blower supplying the first 26 and second 30 air curtains.

The control of the orientation of the resulting air curtain by the control unit 34 by adjusting the flows of the first 26 and second 30 air curtains makes it possible to optimize the passage of people through the opening 16. More particularly, when the cabin 10 is a railroad vehicle car, this makes it possible to optimize the flow of passengers at a station.

For example, the control unit 34 is able to go from a first operating mode, in which the flow of the first air curtain 26 is increased and the flow of the second air curtain 30 is reduced, to favor the movement of people from the outside zone 14 toward the inside zone 12. In this case, the resulting air flow tends to drive the people entering from the outside zone 14 toward the inside zone 12, and to encourage people standing in the inside zone 12 near the opening 16, who may hinder the passage of entering people, to move away.

Conversely, the control unit 34 is also able to go to a second operating mode, in which the flow of the first air curtain 26 is reduced and the flow of the second air curtain 30 is increased to orient the resulting air flow toward the outside and favor the movement of people toward the outside zone 14. In this case, the resulting air flow tends to drive people exiting from the inside zone 12 toward the outside zone 14, and to encourage people standing in the outside zone 14 near the opening 16, who may hinder the passage of exiting people, to move away.

The transition from the first to the second operating mode may be timed from the opening of the door 18, for example to favor the exit of people during a first time delay following the opening of the door 18, then to favor the entry of people during a second time delay, prior to the closing of the door 18.

Alternatively or additionally, the device 20 includes means 36 for detecting people near the plane P. In this case, the control unit is able to adjust the flow of the first 26 and/or second 30 air curtains based on the presence and/or movements of people near said plane P. Thus, instead of timing the first and second operating modes, the control unit 34 stays in the first operating mode as long as people are detected as moving from the inside zone 12 toward the outside zone 14, then stays in the second operating zone as long as people are detected as moving from the outside zone 14 toward the inside zone 12.

According to another alternative, the transition to the first or second operating mode can be commanded manually, in particular by the conductor of the rail vehicle and/or by a station agent.

Furthermore, the control unit 34 is advantageously able to reduce the flows of the first 26 and second 30 air curtains when people are detected near the plane P, for the comfort of said people.

Alternatively or additionally with respect to the operating modes described above, the control unit 34 advantageously has a third operating mode in which the flow of the first 26 and/or second 30 air curtain is increased, prior to the transition of the door 18 from its open position to its closed position, so as to encourage people located near the plane P to move away from said plane P, so as not to hinder the closing of the door 18.

Alternatively, this flow increase is only done when at least one person is detected near the plane P by the detection means 36.

Advantageously, the device 20 includes means 38 for detecting weather conditions in the outside zone 14, for example arranged on the control unit 34. These detection means 38 are in particular able to measure a temperature in the outside zone and/or to detect rain or snow and/or to detect the wind speed.

The control unit 34 is then able to adjust the flow and/or temperature of the first 26 and/or second 30 air curtain based on the detected weather conditions.

The temperature of the air curtains can in particular be increased when the measured outside temperature is below a predetermined threshold, and/or when manually commanded. In this case, the temperature of the second air curtain 30 is preferably lower than that of the first air curtain 26, such that the temperature evolves gradually from the outside zone 14 toward the inside zone 12.

Likewise, the temperature of the first 26 and/or second 30 air curtain can be lowered when the detected outside temperature is above a predetermined threshold, and/or when manually commanded. In this case, the temperature of the second air curtain 30 is preferably higher than the temperature of the first air curtain 26, such that the temperature evolves gradually from the outside zone 14 toward the inside zone 12.

The optimal temperatures for the air curtains can be calculated by the control unit 34 based on the outside temperature, or alternatively can be chosen manually.

Advantageously, the control unit 34 is configured to increase the flow of the two air curtains 26, 30 when rain or wind is detected. Thus, the resulting air flow has a drying effect for passengers passing through it and a wind protection function.

Advantageously, the device 20 further includes means 40 for air conditioning the inside zone 12, able to enter different air conditioning states of the inside zone 12, in particular as a function of weather conditions in the outside zone 14. In particular, the air conditioner 40 are able to modify the temperature in this inside zone 12. These air conditioner 40 are for example traditional means equipping a railroad vehicle car of the state of the art.

The control unit 34 is connected to these air conditioner 40, and is able to adjust the flow and/or temperature of the first air curtain 26 and/or the second air curtain 30 as a function of the state of the air conditioner 40.

In particular, the first air curtain 26 is heated or cooled substantially at the same temperature as that set out in the inside zone 12 by the air conditioner 40.

Advantageously, the control unit 34 is configured to interrupt the second air curtain when the door 19 is in the closed position or after a time delay following closing of that door. In this case, this second air curtain 30 is reactivated prior to opening of the door 18, in particular at a station, for example in order to encourage people near this door 18 to move away before it opens.

Conversely, the first air curtain 26 is advantageously kept activated even when the door 18 is closed, in order to optimize the thermal insulation thereof, and thus keep the inside 12 under optimal air conditioning conditions.

It will be noted that the invention is not limited to the described embodiment, but may assume various alternatives.

In particular, other operating configurations of the air curtains and orientations can be considered, optionally involving more than two air curtains or air knives.

What is claimed is:

1. An air curtain generating device for generating air curtains along a plane defining an inside zone and an outside zone, comprising:
   a first air curtain generator configured to generate a first air curtain, comprising a first air curtain diffuser configured to diffuse the first air curtain along said plane in the first diffusion direction,
   a second air curtain generator configured to generate a second air curtain, comprising a second air curtain diffuser configured to diffuse the second air curtain along said plane in a second diffusion direction,
      wherein the first diffusion direction is oriented toward the inside zone and the second diffusion direction is oriented toward the outside zone, and
   a controller configured to control the diffusion of the first air curtain and the second air curtain,
   wherein the controller is able to enter a first operating mode, in which the flow of the first air curtain is increased and/or the flow of the second air curtain is reduced to favor the movement of people from the outside zone toward the inside zone, or in a second operating mode, in which the flow of the first air curtain is reduced and/or the flow of the second air curtain is increased to favor the movement of people from the inside zone toward the outside zone, and wherein the controller is configured so that the transition from the first to the second operating mode is timed from opening of a door, so as to trigger the second operating mode during a first time delay following the opening of the door, then to switch to the first operation mode during a second time delay, prior to the closing of the door.

2. The air curtain generating device according to claim 1, wherein:
   the air curtain generating device includes an orientation modifier configured to modify the orientation of the first and second air curtain diffusers, between a first position, in which the air curtain is diffused in the first diffusion direction, and a second position, in which the air curtain is diffused in the second diffusion direction.

3. The air curtain generating device according to claim 1, wherein the first and second air curtains together generate, by venturi effect, a resulting air flow diffusing in a resulting direction, the controller being able to modify said resulting direction by modifying the flows of the first and second air curtains.

4. The air curtain generating device according to claim 1, wherein the first and second air curtain diffusers include nozzles for emitting an air curtain, at least one of the nozzles being arranged to emit the corresponding air curtain vertically, and at least one of the nozzles being arranged to emit the corresponding air curtain horizontally.

5. The air curtain generating device according to claim 1, wherein the controller is able to regulate a flow of each air curtain.

6. The air curtain generating device according to claim 5, including a people detector configured to detect people near said plane, the controller being configured to adjust the flow of the at least one air curtain based on the presence and/or movements of people near said plane.

7. The air curtain generating device according to claim 5, including a weather detector configured to detect conditions in the outside zone, said weather detector comprising an instrument selected from the group consisting of a temperature sensor, a rain detector, a snow detector and a wind sensor, wherein the controller is configured to adjust the flow of each air curtain based on the detected weather conditions.

8. The air curtain generating device according to claim 5, including an air conditioner for air conditioning in the inside zone, able to enter different air conditioning states of said inside zone, the controller configured to adjust the flow of the at least one air curtain as a function of the status of the air conditioner.

9. The air curtain generating device according to claim 8, wherein the controller is able to regulate the temperature of each air curtain by controlling operation of the air conditioner.

10. The air curtain generating device according to claim 8, wherein the air conditioner is configured to enter different air conditioning states of said inside zone, the controller being configured to adjust the temperature of the at least one air curtain as a function of the status of the air conditioner.

11. An air curtain generating device for generating air curtains along a plane defining an inside zone and an outside zone, comprising:
   a first air curtain generator configured to generate a first air curtain, comprising a first air curtain diffuser configured to diffuse the first air curtain along said plane in a first diffusion direction,
   a second air curtain generator configured to generate a second air curtain, comprising a second air curtain diffuser configured to diffuse the second air curtain along said plane in a second diffusion direction,
      wherein the first diffusion direction is oriented toward the inside zone and the second diffusion direction is oriented toward the outside zone, and a controller configured to control the diffusion of the first air curtain and the second air curtain, wherein the controller is able to enter a first operating mode, in which the flow of the first air curtain is increased and/or the flow of the second air curtain is reduced to favor the movement of people from the outside zone toward the inside zone, or in a second operating mode, in which the flow of the first air curtain is reduced and/or the flow of the second air curtain is increased to favor the movement of people from the inside zone toward the outside zone, wherein the device includes a detector for detecting people near the plane, the controller being configured so as to adjust the flow of the first and/or second air curtains based on the presence and/or movements of people near said plane, the controller being configured to stay in the second operating mode as long as people are detected as moving from the inside zone toward the outside zone, then stays in the first operating zone as long as people are detected as moving from the outside zone toward the inside zone.

12. An air curtain generating device for generating air curtains along a plane defining an inside zone and an outside zone, comprising:

a first air curtain generator configured to generate a first air curtain, comprising a first air curtain diffuser configured to diffuse the first air curtain along said plane in a first diffusion direction, a second air curtain generator configured to generate a second air curtain, comprising a second air curtain diffuser configured to diffuse the second air curtain along said plane in a second diffusion direction,
wherein the first diffusion direction is oriented toward the inside zone and the second diffusion direction is oriented toward the outside zone, and a controller configured to control the diffusion of the first air curtain and the second air curtain, wherein the controller is able to enter a first operating mode, in which the flow of the first air curtain is increased and/or the flow of the second air curtain is reduced to favor the movement of people from the outside zone toward the inside zone, or in a second operating mode, in which the flow of the first air curtain is reduced and/or the flow of the second air curtain is increased to favor the movement of people from the inside zone toward the outside zone, wherein the controller is configured so that the transition to the first or second operating mode is commanded manually.

* * * * *